US008662343B1

(12) United States Patent
Coors et al.

(10) Patent No.: US 8,662,343 B1
(45) Date of Patent: Mar. 4, 2014

(54) PRESSURE VESSEL AND METHOD OF USE

(71) Applicants: Andrew Coors, Morrison, CO (US);
Kaushik Mallick, Thornton, CO (US)

(72) Inventors: Andrew Coors, Morrison, CO (US);
Kaushik Mallick, Thornton, CO (US)

(73) Assignee: Steelhead Composites, LLC, Golden, CO (US)

( * ) Notice: Subject to any disclaimer, the term of this patent is extended or adjusted under 35 U.S.C. 154(b) by 0 days.

(21) Appl. No.: 13/861,909

(22) Filed: Apr. 12, 2013

(51) Int. Cl.
*F17C 1/12* (2006.01)
*F17C 1/00* (2006.01)
*F17C 13/00* (2006.01)

(52) U.S. Cl.
CPC . *F17C 1/12* (2013.01); *F17C 1/005* (2013.01);
*F17C 13/002* (2013.01); *F17C 2260/023*
(2013.01); *F17C 2203/068* (2013.01)
USPC ............................................. 220/586; 206/0.6

(58) Field of Classification Search
CPC .............. F17C 1/005; F17C 1/10; F17C 1/12;
F17C 1/16; F17C 13/002; F17C 2260/031;
F17C 2260/033; F17C 2260/03; F17C
2260/023; F17C 2260/02; F17C 2203/03;
F17C 2203/0675; F17C 2203/068
USPC ........ 220/588, 586, 581, 62.22, 62.19, 62.11;
206/0.6
See application file for complete search history.

(56) References Cited

U.S. PATENT DOCUMENTS

| 3,820,162 | A * | 6/1974 | McGrew | 2/2.11 |
| 4,581,285 | A * | 4/1986 | Mahefkey, Jr. | 442/378 |
| 2004/0040969 | A1 * | 3/2004 | DeLay et al. | 220/586 |
| 2011/0185764 | A1 * | 8/2011 | Kelly | 62/457.2 |
| 2012/0017608 | A1 * | 1/2012 | Lee et al. | 62/47.1 |
| 2012/0225290 | A1 | 9/2012 | Hartmann et al. | |
| 2013/0020318 | A1 * | 1/2013 | Oliver | 220/62.13 |
| 2013/0153583 | A1 * | 6/2013 | Kleschinski et al. | 220/590 |

OTHER PUBLICATIONS

E. Shipley, "Study of Natural Gas Vehicles (NGV) During the Fast Fill Process", Ph. D. Thesis, 2002, West Virginia University.
M. Farzaneh-Gord, "Real and Ideal Gas Thermodynamic analysis of Single Reservoir Filling Process of Natural Gas Vehicle Cylinders", J. of Theoretical and Applied Mechanics, Sofia, 2001, vol. 41, No. 2, pp. 21-36.
D. Horning, "Natural Gas Solutions for Transportation", Dec. 7, 2012.
Y. Takagi et al., "Transport Phenomena during the Fast Filling Process in a Hydrogen Tank for the Fuel Cell Vehicle", J. of Advanced Research in Physics, Jul. 2011.
K. J. Kountz, Modeling the fast fill process in natural gas vehicle storage cylinders, presented at: 207th ASC National Meeting-Division of Fuel Chemistry, San Diego (1994), pp. 462-469.

(Continued)

*Primary Examiner* — Robert J Hicks
(74) *Attorney, Agent, or Firm* — Don D. Cha; Hamilton DeSanctis & Cha, LLP

(57) ABSTRACT

The present invention provides a device and a method that minimizes or eliminates under-filling of a pressure vessel by integrating phase change material (PCM) within one or multiple component of the pressure vessel. In one particular embodiment, the inner surface of the pressure vessel comprises a PCM. During a gas-filling process, PCM reduces the rate and/or the amount of temperature increase. Reduction of the temperature increase in the pressure vessel increases the amount of gas filled during a gas-filling process.

7 Claims, 6 Drawing Sheets

(56) References Cited

OTHER PUBLICATIONS

ISO 11439:2000 International Standard, "Gas cylinders—High pressure cylinders for the onboard storage of natural gas as a fuel for automotive vehicles", Sep. 15, 2000.

M. Trugeon, "An Overview of NGV Cylinder Safety Standards, Production and In-Service Requirements", Jul. 2005.

R. Hirotani et al., "Thermal Behavior in Hydrogen Storage Tank for Fuel Cell Vehicle on Fast Filling", WHEC 16 / Jun. 13-16, 2006—Lyon France.

David Hirschi, "Understanding Differences between Thermal Interface Materials: Improve your ability to specify the optimum TIM", Dow Corning Case Study, 2008, Dow Corning Corp.

Pasupathy and R. Velraj, "Phase Change Material Based Thermal Storage for Energy Conservation in Building Architecture", International Energy Journal: vol. 7, No. 2, Jun. 2006.

A. Sharma, V. V. Tyagi, C. R. Chen and D. Buddhi, "Review on thermal energy storage with phase change materials and application", Renewable and Sustainable Energy Reviews, 2009, vol. 13, Issue 2, pp. 318-345.

L. G. Socaciu, "Thermal Energy Storage with Phase Change Materials", Leonardo Electronic Journal of Practices and Technologies, Issue 20, Jan.-Jun. 2012, pp. 75-98.

http://www.outlast.com/, printed Apr. 15, 2013.

http://www.gizmag.com/phase-change-cup-coffee/12596/, printed Apr. 15, 2013.

http://www.micronal.de/portal/basf/ien/dt.jsp?setCursor=1_290814, printed Apr. 15, 2013.

http://en.wikipedia.org/wiki/Rotational_molding, printed Apr. 15, 2013.

http://www.engineershandbook.com/MfgMethods/blowmolding.htm, printed Apr. 15, 2013.

http://www.compositesworld.com/articles/next-generation-pressure-vessels, printed Apr. 15, 2013.

http://lightsailenergy.com/index.html, printed Apr. 15, 2013.

* cited by examiner

PRESSURE VESSEL AND METHOD OF USE

FIELD OF THE INVENTION

The present invention relates to a device comprising a vessel that is capable of storing gas under pressure. In particular, the vessel has an inner surface that comprises a phase-change material. The phase-change material reduces the amount of temperature increase during a gas filling process compared to a similar vessel that does not have a phase-change material. This reduction in temperature increase allows for greater amount of gas to be filled at a given pressure.

BACKGROUND OF THE INVENTION

Unlike liquid fuel, which consistently holds about the same volume of fuel across a broad range of conditions, the amount of gaseous fuel inside a storage vessel depends on the pressure and temperature of the gas. The problem of "under-filling" is a phenomenon whereby a vessel is filled with less-than-desired mass of gaseous fuel. While filling the vessel rated for a certain pressure, the gas temperature rises during the filling process [1]. This temperature rise reduces the density of the gas and packs fewer gas molecules in the vessel than what would be possible had the temperature remained constant. As the temperature of the gas in the cylinder equilibrates with the environment after the filling process is complete, the user has less mass of gas in the vessel than what the rated pressure and initial temperature would have allowed. This essentially results in an under filled vessel relative to its rated specification.

Under-filling of gaseous fuel during a filling process causes the vehicle user to experience a reduced driving range. Typically the temperature rise is compensated for in the fuelling station dispenser by transiently over-pressurizing the tank. The amount of over-pressurization is dictated by the capabilities of the filling station, the pressure differential between the dispenser of the filling station and the vessel's pressure, ambient temperature and the design capacity allowed for in the vessel to handle pressure higher than its rated designation. Currently there is no means to compensate for the under-filling problem by thermal management of the heat generated during the filling process.

Despite current understanding of the problems associated with the temperature increase during a gas-fill process, to date no adequate method or device is available that can reduce the amount of temperature increase during a gas-fill process, in particular during a fast-fill process.

SUMMARY OF THE INVENTION

Some aspects of the invention alleviate the problem of under-filling by providing a gas storage device that can reduce the amount of heat energy generated during a gas filling process rather than simply relying on over-pressurizing the vessel. In particular, the gas storage device of the invention is designed to absorb heat energy that is generated during a gas filling process by utilizing a phase-change material (PCM). The use of PCM reduces the temperature increase in the gas and minimizes or eliminates reduction of the gas density during a gas fill process. The process of heat energy absorption by PCM is transparent to the filling process and the operation of the filling station.

Some aspects of the invention provides a device and a method for reducing the amount of temperature increase in a gas storage device during a gas-filling process, in particular during a fast-filling process. As used herein, the term "fast-filling process" refers to filling a gas storage device (e.g., 20 gasoline gallon equivalent gas storage devices of a natural gas vehicle, i.e., NGV) within 10 minutes or less and typically within 5 minutes or less. It should be appreciated that as the gas storage device becomes filled with gas, its rate of filling will decrease.

One particular aspect of the invention provides a device comprising a vessel capable of storing gas under pressure. The vessel includes an orifice that can be used to fill the vessel with gas. The vessel also includes an inner surface that comprises a phase-change material. The presence of a phase-change material in the inner surface of the vessel reduces the temperature change within the interior of the vessel during a gas filling process. Typically, the phase-change material reduces the amount of temperature increase significantly compared to a similar gas storage vessel that does not have the phase-change material but is otherwise made of the same material. Typically, the PCM comprises a material that melts (i.e., changes phase) from solid to liquid at a certain temperature. The useful PCMs of the invention have a melting point in the range of from about 0° C. to about 80° C. typically from about 20° C. to about 50° C.

Other aspects of the invention provide a method for increasing the amount of gas filled in a vessel during a gas filling process. The method generally comprises providing a phase-change material on the inner surface of the gas storage vessel. The presence of phase-change material in the inner surface of the vessel substantially reduces the temperature and pressure increase during a gas filling process compared to a similar gas storage vessel that does not have a PCM. This reduction in the amount of temperature and pressure increase allows the vessel to be filled with a higher amount of gas compared to a similar vessel that does not have a phase-change material.

In some embodiments, the phase-change material reduces the temperature increase by at least 10° C., typically by at least 20° C. and often at least 30° C. in Type 4 tanks during a fast-fill process compared to a similar vessel that does not have the phase-change material.

Another aspect of the invention provides a device comprising a vessel capable of storing gas under pressure within an internal chamber. The internal chamber's surface comprises a phase-change material such that the presence of the phase-change material reduces the temperature change within the internal chamber during the compression of the gas. In some embodiments, the internal chamber comprises a bladder type vessel that stores gas under pressure.

DETAILED DESCRIPTION OF THE INVENTION

Under industry standard conditions, some natural gas vehicle (NGV) tanks are designed to hold about 20 gasoline gallon equivalents. But on a hot day during a gas filling process, the gas will expand and the tank may only fill to 75% of its potential at a certain maximum tank pressure. In fact, the amount of compressed natural gas (CNG) that can be stored onboard varies based on a variety of factors including the pressure rating of the fuel storage system, the ambient temperature, and the fueling rate.

Figure 1:
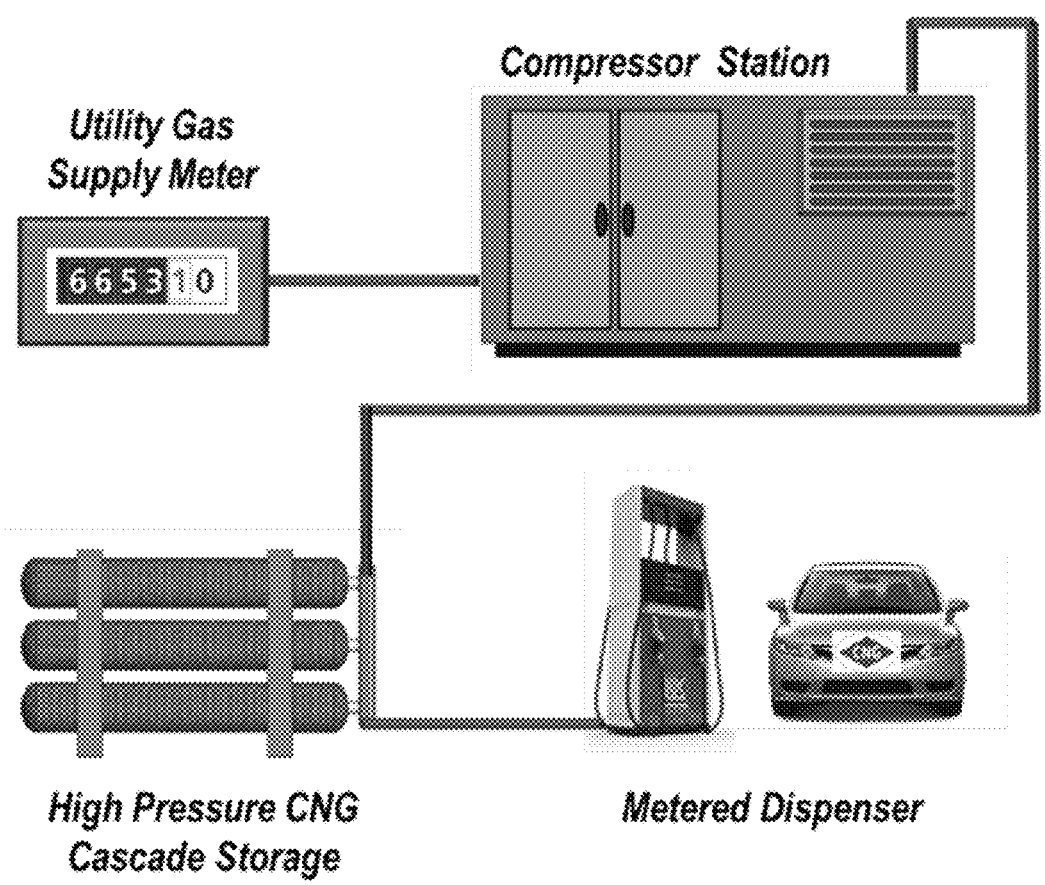
FIG. 1 is a schematic diagram of a compressed natural gas filling station.

Fueling is an overflow process from the storage tank (high volume with a high pressure level) into the vehicle tank (low volume and low initial pressure). FIG. 1 shows a typical CNG fast filling station. Fast-fill stations are generally best suited for retail situations where light-duty vehicles, such as vans, pickups, and sedans, arrive randomly and need to fill up quickly. Gas from the distribution pipeline, usually "low" pressure (e.g., <60 psi) or possibly "medium" pressure (e.g., around 230 psi), is compressed using a large multi-stage compressor into a "cascade" storage system [1]. This system is maintained at a pressure higher than that in the vehicle's on-board storage so that gas flows to the vehicle under differential pressure. Typically, the cascade storage allows filling a vessel in the range of 3,000 psi to 4,350 psi.

Figure 2:
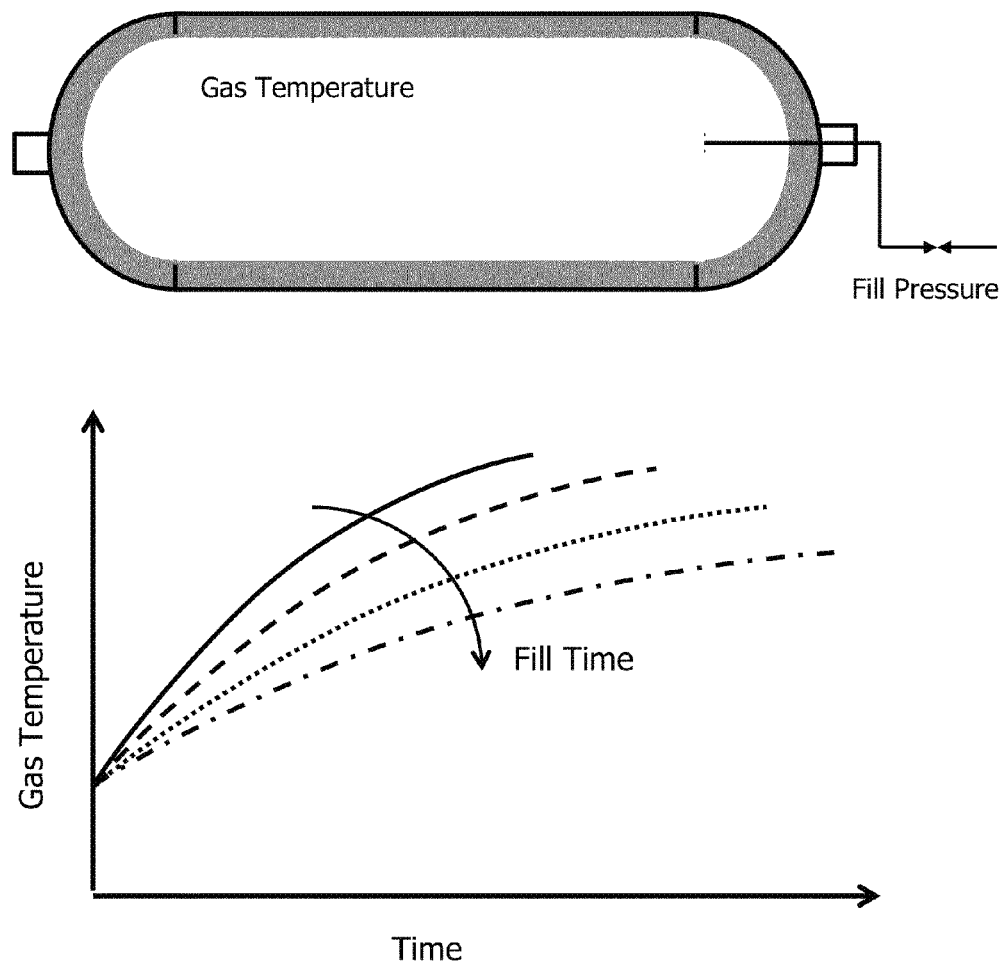
FIG. 2 shows a cross-section of a convention gas cylinder with a graph of temperature rise in the gas cylinder during a fast-fill process.

During the filling of a gas cylinder, vessels encounter a rise in temperature as a function of ambient temperature, vessel size and speed of fill. A fast fill is defined as filling a gas storage vessel (e.g., a cylinder) in 10 minutes or less and often 5 minutes or less. Empirical evidence suggests that the gas temperature rises by 30 to 40° C. during a fast fill process. Faster filling results in significant heating of the gas in the tank (see, for example, FIG. 2), thereby often resulting in under filling.

In addition to CNG, the temperature rise during a fast filling of a vessel with gaseous hydrogen has also been tested and verified with analytical models by several researchers [4,5].

The problem of under-filling during a fast-fill process due to rise in temperature within the tank is a general problem that exists in virtually all applications that utilize gas including in aerospace, medical, industrial, automotive, oil and gas, and many sports applications. The filling gas, i.e., gas used to fill a vessel, include, but are not limited to, CNG, propane, hydrogen, helium, oxygen, carbon-dioxide, nitrous-oxide, argon, xenon, neon, acetylene, nitrogen, air, chlorine, fluorine and such.

As discussed above, in many instances, undercharging of gas is a result of temperature increase within the gas storage vessel during the filling process. Without being bound by any theory, it is believed that such an increase in the temperature occurs due to several factors including conversion of enthalpy of the stored gas in the high pressure storage tank to internal energy in the vehicle tank and compression of the gas during the filling process. In general, a faster-fill process results in a higher temperature increase. As used herein, unless the context requires otherwise, the term "temperature increase" when referring to a gas fill-process refers to the increase in the temperature within the interior space and the inner surface of the gas storage device relative to its temperature at the beginning of the gas-fill process. Temperature increase within the gas storage vessel during a fast-fill process is a widespread problem that is well defined in thermodynamic literature. For example, it has been shown that in CNG, fast filling can result in under-filling by as much as 20% [6] and in hydrogen by as much as 30%. For a tank that is rated to a specific pressure, the consumer either has to sacrifice time (e.g., by slowing the charging rate) or sacrifice range (e.g., distance or usage until next required refuel). The resulting reduced driving range of a gas-powered vehicle is a serious obstacle that the gas industry is striving to overcome without resorting to unnecessarily high fueling station pressures or by applying extensive over-pressurization during the fueling operation. Consequently, the on-board storage capacity of pressurized gas vehicles, such as natural gas (CNG) or hydrogen vehicles, is a major obstacle to the wide spread adoption of these alternate fueled vehicles.

Currently, the design or regulatory standards for CNG vessels for service pressure is either 3,000 psi or 3,600 psi depending on the type of gas-fueled vehicles being served. These standards allow for overfilling, which takes into account for the increased temperature generated during fast filling, and therefore use the overfilled condition as the upper limit in the pressure cycle tests. For example, a maximum pressure of 3,770 psi is permitted in ISO 11439 [7] regardless of ambient temperature [8]. This allowance for the maximum pressure necessitates gas storage systems with higher safety margins resulting in a higher overall cost and weight to the gas storage systems.

The type of material used in a gas storage vessel can also influence the amount of temperature increase during the fast-fill process. For example, the difference in the amount of temperature increase between different rates of pressure increase is relatively small in a Type 3 (metal lined) tank, but the temperature increase in the Type 4 (polymer lined) tank becomes significantly higher as the rate of pressure increases [9]. It is believed that this difference in the rate of temperature increase is due to the coefficients of thermal diffusivity and thermal conductivity of aluminum being a significantly larger than those of thermoplastic polymer in the liner of Type 4 tanks.

Some aspects of the invention provide a device for storing a gaseous compound. The device comprises a vessel in which the inner surface includes a phase-change material (PCM). PCMs have been incorporated in garments and linings for garments to provide the benefit of proactive temperature regulation by managing body heat and moisture [10]. PCMs have also been used as thermal interface materials (TIMs) and/or thermal greases/pads to enhance heat management and heat transfer between two electronic interfaces. Such TIMs have excellent wetting at interfaces during typical operating temperature range, resulting in very low surface contact resistance [11]. PCMs have also been incorporated in thermal energy storage (TES) devices in power grids as well as in building architecture. TES is typically used for a temporary storage of thermal energy for later use and essentially bridges the time gap between energy requirement and energy use. Thermal energy storage systems provide the potential to attain energy savings, which in turn reduce the environment impact related to energy use. PCMs have also been used in beverage receptacles including coffee mugs to keep the beverage at a desired temperature for an extended period of time [13].

Figure 3:
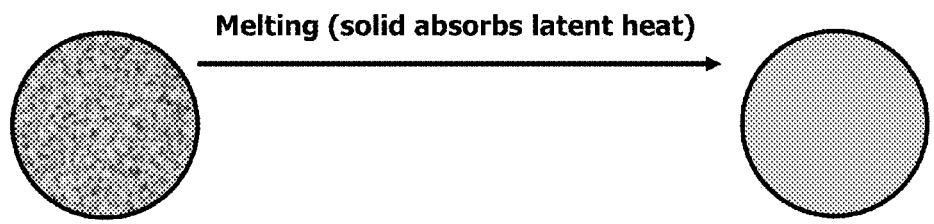
FIG. 3 is a schematic representation of phase change process.

Thermochemical systems rely on the energy absorbed and released in breaking and reforming molecular bonds in a reversible chemical reaction. In this case, the heat stored depends on the amount of storage material, the endothermic heat of reaction, and the extent of conversion. Amongst above thermal heat storage techniques, latent heat thermal energy storage is particularly attractive due to its ability to provide high-energy storage density and its characteristics to store heat at constant temperature corresponding to the phase transition temperature of phase change material. Phase change can be in the following form: solid-solid, solid-liquid, solid-gas, liquid-gas and vice versa. Phase change process of PCM from solid to liquid and vice versa is schematically illustrated in FIG. 3.

PCMs are "Latent" heat storage materials. The thermal energy transfer occurs when a material changes from solid to liquid, or liquid to solid. This is called a change in state, or "Phase." Compared to the storage of sensible heat, there is no significant temperature change during the phase change. Initially, these solid-liquid PCMs perform like conventional storage materials; their temperature rises as they absorb heat. Unlike conventional (sensible) storage materials, PCMs absorb and release heat at a nearly constant temperature. PCMs can store 5 to 14 times more heat per unit volume than sensible storage materials such as water, masonry, or rock [15]. A large number of PCMs are known to melt with a heat of fusion in any required range. However, for their employment as latent heat storage materials these materials should exhibit certain desirable thermodynamic, kinetic and chemical properties. Moreover, economic and ready availability of these materials should also be considered.

One of the factors in selecting a particular PCM for a given application include matching the transition temperature of the PCM for the given application. In addition, the operating temperature of heating or cooling should be matched to the transition temperature of the PCM. The latent heat should be as high as possible, especially on a volumetric basis, to minimize the physical size of the heat stored. High thermal conductivity would assist the charging and discharging of the energy storage.

Exemplary PCMs that are suitable for the invention include, but not limited to, organic materials such as paraffin and fatty acids, salt hydrates, water, eutectics, naturally occurring hygroscopic materials, metals and metallic particles, nano-materials. Some of the particular PCMs suitable for the invention include, but are not limited to, heptanone-4®, n-Unedane®, TEA_16®, ethylene glycol, n-dodecane, Thermasorb 43®, Thermasorb 65®, Thermasorb 175+®, Thermasorb 215+®, sodium hydrogen phosphate, Micronal®, and an assortment of other polymeric PCMs.

The vessel also includes an orifice that is adapted to be used to fill the vessel with gas. This orifice can also be used as an outlet port of the gas within the vessel. The vessel can optionally include an additional orifice or orifices that can be used as a gas outlet such that the inlet and the outlet of gas are separate. The device can also include additional elements such as a gauge to measure the internal pressure of the vessel.

Figure 4:
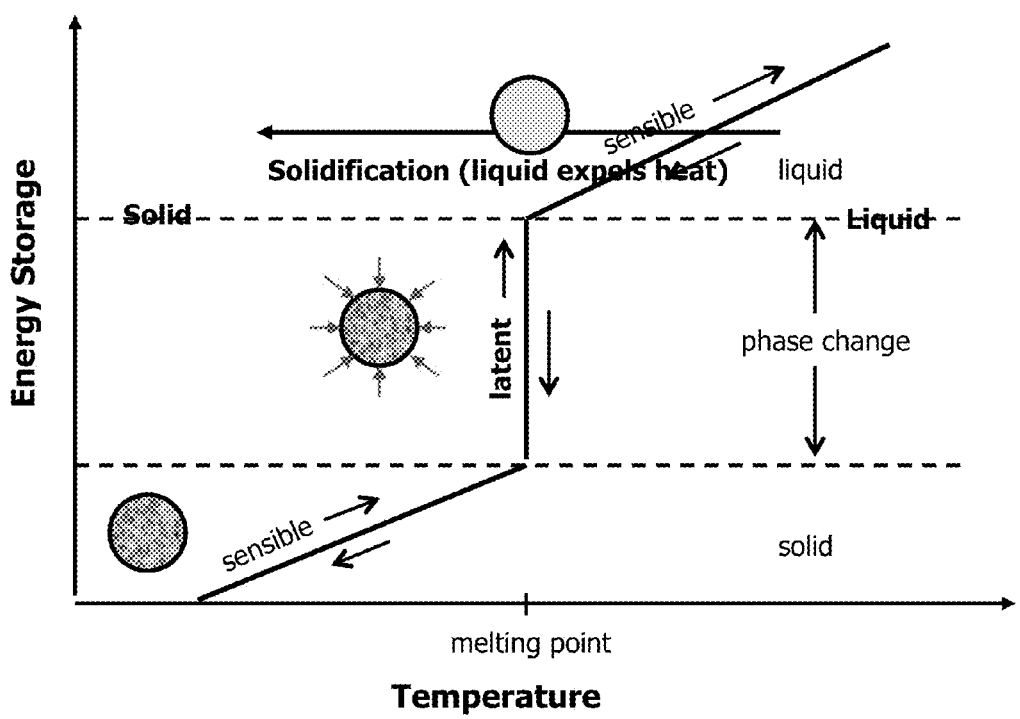
FIG. 4 is a typical thermal cycle graph of a Phase Change Material.

As stated above, the inner surface of the vessel includes a phase-change material. The PCM can be present as a coating on the inner surface of the vessel or it can form an intimate part of the inner surface itself. In some embodiments, PCM is microencapsulated. Micro-encapsulation enables handling of the PCMs independently of being solid or liquid. The microencapsulation involves forming tiny particles of solid, liquid or gas that surround the PCM core material with a hard polymeric shell. The coated, i.e., microencapsulated, particles can then be incorporated in any matrix such as thermoplastics or elastomers that is compatible with the encapsulating film. When subjected to a thermal flux, thermoplastics or elastomers with embedded micro-encapsulated PCMs exhibit a thermal cycle that is schematically illustrated in FIG. 4.

Exemplary thermoplastics that are useful in the invention include, but are not limited to, polyethylene (PE), cross-linked polyethylene (XLPE), polyvinyl chloride (PVC), liquid crystal polymer (LCP), and fluoroplastics (PTFE) etc. Thermoplastics are typically used as the material for liners in composite overwrapped pressure vessels. As used herein, the term "pressure vessels" refers to an element of a device that is used to store a gas under pressure. These liners can be formed by any of the manufacturing processes known to one skilled in the art, such as rotomolding, injection molding, spin forming or resin transfer molding. The PCM material can be embedded in the thermoplastic material during the manufacturing process of the liner in a pre-determined stoichiometric ratio. This incorporation of PCM within the thermoplastic allows the liner to absorb heat energy during the gas-fill process.

In other embodiments, PCM is coated onto the inner surface of the vessel. Still in other embodiments, PCM is interdispersed within the inner surface of the vessel. Yet in other embodiments, at least a portion of the vessel is made from a material comprising the PCM. In this manner, PCM forms an integral part of the vessel.

The presence of PCM in the inner surface of the vessel of the device reduces the temperature increase within the interior of the vessel during a gas filling process compared to the similar vessel in the absence of PCM. As used herein, the term "similar vessel" refers to a vessel that is identical in composition as that of the vessel of the invention except for the presence of PCM. During filling of the vessel with a gaseous fuel, PCM absorbs thermal energy caused by pressurization. This absorption of thermal energy by PCM reduces the amount of temperature, and hence the pressure, increase associated with gas fill-process, thereby increasing the amount of gas filled during the fill-process and reducing the severity of under-filling compared to a similar vessel that does not have PCM. For example, the device of the invention at standard temperature and pressure (i.e., 1 atmospheric pressure at 20° C.) can be filled with at least 5% more, typically at least 10% more, and often at least 15% more gas than a similar device that does not have PCM using a fast-fill process.

Figure 5:
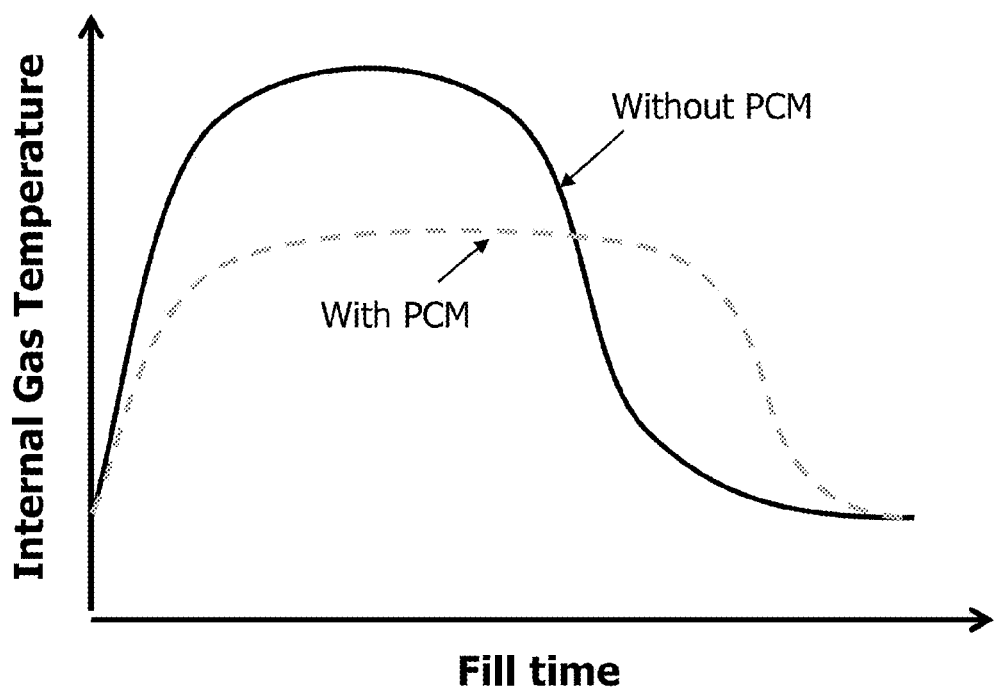
FIG. 5 is a comparative graph of temperature vs. fill time in a gas storage vessel with and without PCM during a fast-fill process.

As graphically illustrated in FIG. 5, during the fast-fill process the temperature of the gas increases steadily, reaches a plateau and then dissipates during the post-fill period. In the vessel without PCM, the gradual release of heat energy during the post-fill period is facilitated by thermal sinks such as metallic liner, metallic polar boss and/or metallic tank valves and regulators attached to the pressure vessel. In contrast, a vessel that incorporates a PCM absorbs thermal energy generated during the fill-process, and uses the thermal energy to convert the PCM from, for example, solid to liquid phase. This allows the plateau temperature experienced by the gas to be lower in the presence of the PCM. The latent heat is dissipated slowly as the PCM material re-solidifies in the post-fill period. This results in a slower ramp down from the plateau temperature during the post-fill process compared to a vessel with a traditional liner.

At present, the primary packaging options for gaseous transportation and storage applications include pressure vessels Type 1, Type 2, Type 3 and Type 4. One of the key differentiator for each vessel type is its load-bearing element and associated material, whether a monolithic metallic pressure vessel, or a combination of metal or non-metallic liner and external wrap. Recently, linerless composite tanks have been developed where the composite shell itself serves as the permeation barrier and have been designated as Type 5 [20]. Methods disclosed herein can be adapted to any one of the currently known pressure vessels as well as other pressure vessels that become available.

Without being bound by any theory, thermodynamically speaking, the amount of gas filled during the fast-fill process depends strongly on the peak temperature for a given maximum filling pressure. Since the plateau temperature, i.e., the amount of temperature increase, (see FIG. 5) experienced by a vessel with PCM on the inner surface is lower than that in a traditional vessel without PCM, increased mass, i.e., the amount, of the stored gas is realized by the device of the invention.

As stated above, the incorporation of PCMs in the inner surface of the vessel, e.g., vessel liner or the vessel wall, enables a higher volume of gas to be filled during a gas-filling process, particularly during a fast-fill process at a given pressure. For a CNG vessel designed for 3,600 psi working pressure, the mass of gas filled is at least 5% higher, typically at least 10%, higher, often at least 15% higher, and most often in the range of 15 to 25% higher than what is currently achieved during a fast fill process without the PCMs. For a $H_2$ vessel designed for 10,000 psi working pressure, the increased gas content is at least 10% higher, typically at least 15% higher, often at least 20% higher, and most often in the range of 20 to 40% higher than what is currently achieved during a fast fill process without the PCMs. For other gases, the mass of filled gas during fast fill process is at least 5% higher, typically at least 10% higher, and often typically in the range of 10 to 30% higher than what is currently achieved without the PCMs.

The device of the invention can be made by any of the methods known to one skilled in the art including a rotomolding process, which is described at for example, [17]. Briefly, the process involves a heated hollow mold which is filled with a charge or shot weight of polymeric material incorporating PCMs. The mold is then slowly rotated (usually around two perpendicular axes) causing the heated and softened material to disperse and uniformly coat the interior of the mold. In order to maintain even thickness throughout the inner surface of the vessel, the mold is rotated during the manufacturing process. A typical rotomolding process includes three stages: heating, temperature hold and cool-down process.

A gas storage vessel having an inner surface comprising PCM can also be produced by a rotolining process. The rotolining process can be used to coat the interior of a metallic vessel, a metallic liner or a metallic pipe where the actual metal component provides the internal cavity. In this process, a uniform layer of material comprising a PCM is applied to the interior surfaces of a metal structure which acts as a mold. The mold can be stationary or rotated along one or multiple axes. Polymer, in a granular form and incorporating the PCM material in a mixture, is injected inside the mold. With the application of a heating cycle, the polymer particles begin to stick to the hot metal substrate and a polymeric skin is formed. This skin gradually forms a homogenous layer of uniform thickness. Ultimate wall thickness is determined by the amount of material that is placed inside the mold.

Another method for producing a vessel comprising a PCM on its inner surface is the blow molding process. Blow molding is a manufacturing process by which hollow thermoplastic parts are formed. In this application, the blow molding process heats the plastic granules incorporating the PCMs into a molten state, the molten material is extruded through a die head to form a parison. The parison is placed between two mold halves. Two halves of the mold is brought together to form a single unit and the parison is inflated using internal pressure. The mold is cooled to solidify the thermoplastic/PCM material. The finished vessel is obtained by removing the mold halves. See, e.g., http://en.wikipedia.org/wiki/Rotational_molding.

Figure 6:
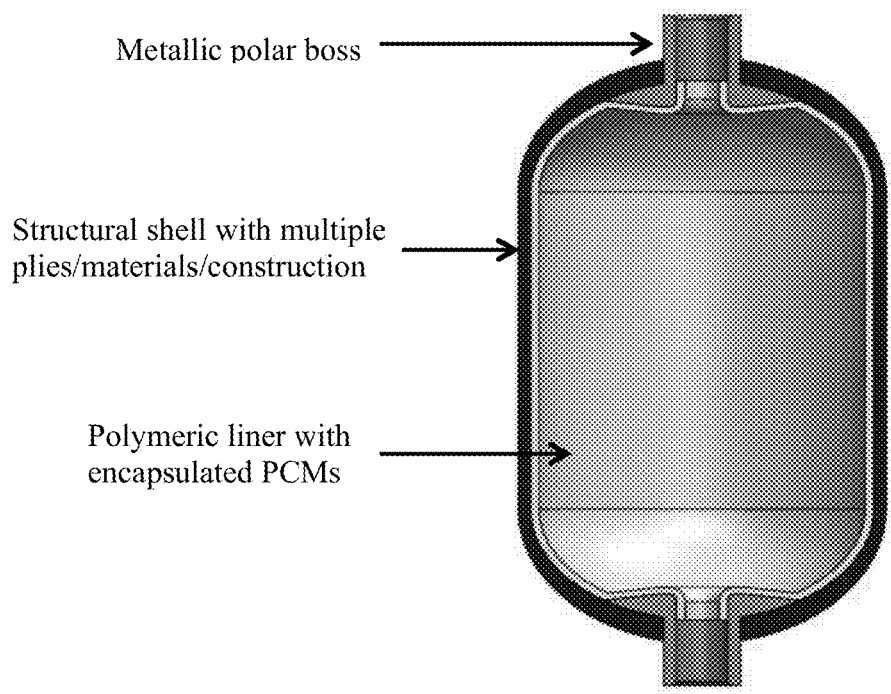
FIG. 6 is a cross-sectional view of a Type 4 composite overwrapped pressure vessel.

In one particular embodiment, PCM is incorporated in a liner for pressure vessels to allow thermal management during fast fill of gaseous fuels. Within this embodiment, in one particular instance PCM is incorporated into a pressure vessel of Type 4 pressure vessel illustrated in FIG. 6. As used herein, the term "incorporate" when referring to PCM and a pressure vessel refers to providing an inner surface of the pressure vessel that comprises a PCM. As stated herein, PCM can be coated onto the inner surface of the pressure vessel, can be an integral part of the pressure vessel, or the pressure vessel can be produced using a material that comprises a PCM. In Type 4 pressure vessel, the PCM loaded polymeric liner can absorb the heat energy generated during the fast fill operation by allowing the phase change to take place at a designated temperature during the filling operation. The liner for the Type 4 vessel can be fabricated by any thermoplastic shaping operation that includes, but is not limited to, rotomolding, rotolining, blow molding and such.

In another embodiment, a Type 3 composite overwrapped pressure vessel is lined with a PCM loaded polymeric wall inside of the primary metallic liner. The metallic liner will provide conductive heat transfer of the latent heat absorbed by the PCM during the fast fill process, enabling further increase in the efficiency of the temperature control and the filling process. The polymeric wall inside the Type 3 vessel can be formed by any fabrication processes known to one skilled in the art such as rotolining that coats the metallic interior with a thermoplastic polymer, a thermoset polymer, a fiber reinforced composite material or a combination thereof.

Figure 7:
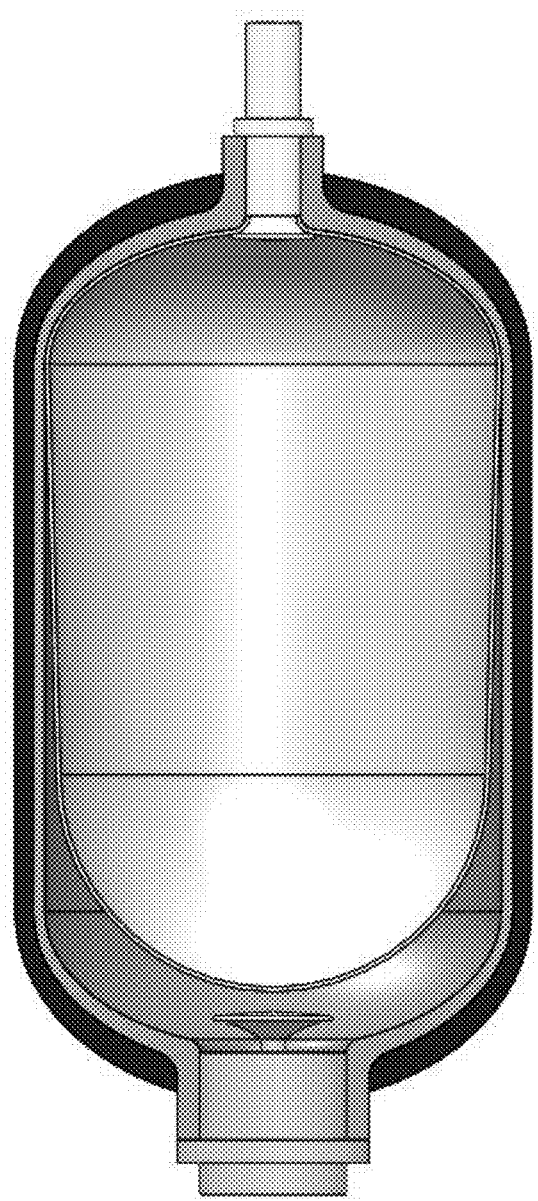
FIG. 7 is a cross-sectional view of a bladder type accumulator inside a Type 3 composite overwrapped pressure vessel.

Still in another embodiment, a bladder type accumulator comprising of a Type 3 or Type 4 composite overwrapped pressure vessel is incorporated with PCM loaded polymeric wall inside of the metallic liner. See FIG. 7.

Yet in another embodiment, the bladder in a bladder type accumulator is incorporated with PCM to reduce the temperature rise during bladder compression to improve the efficiency and energy storage capacity of the accumulator. See FIG. 7.

Yet in another embodiment, a Type 1 or Type 2 metal pressure vessel is lined with the PCM as disclosed herein.

In yet another embodiment of the invention provides a linerless composite pressure vessel (e.g., Type 5) with the PCM material within the thermoset matrix of the polymer composite.

Still yet another embodiment of the invention provides storage containers and transfer pipes that comprise PCM on the inner surface. Such containers and piper can be used for regenerative grid energy storage using compressed air.

Another embodiment of the invention provides a container or receptacle that comprises PCM within its inner surface. Such a container or receptacle can be used to store compressible gas for any industrial, automotive, medical, aerospace, sports or oil and gas application.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

A Type 4 pressure vessel with PCM liner is produced using the following procedure. Microencapsulated PCM material in granular form is mixed in with polyethylene granules in pre-determined mix ratio and is fed to a rotomolding machine. The charge mixture is fed gradually into a heated hollow mold fitted with metallic polar bosses and is slowly rotated around two perpendicular axes causing the softened material to disperse and stick to the walls of the mold. Upon cooling the mold, the liner is demolded and removed from the rotomolding machine. At this stage, the liner includes a main body that comprises polymeric shell interdispersed with PCM and metallic polar bosses at one or both ends. The liner is mounted on a filament winding machine and wrapped with suitable thickness of composite raw material to provide structural strength. Once the composite shell is cured and hardened, the fabrication is complete for the Type 4 pressure vessel designed for gaseous storage. This vessel incorporating the PCM material in the inner liner allows increased gas storage during a fast fill process.

REFERENCES

1. E. Shipley, "Study of Natural Gas Vehicles (NGV) During the Fast Fill Process", Ph. D. Thesis, 2002, West Virginia University.
2. M. Farzaneh-Gord, "Real and Ideal Gas Thermodynamic analysis of Single Reservoir Filling Process of Natural Gas Vehicle Cylinders", J. of Theoretical and Applied Mechanics, Sofia, 2001, Vol. 41, No. 2, pp. 21-36
3. D. Horning, "Natural Gas Solutions for Transportation", Dec. 7, 2012.
4. Bill Winters, "70 MPa Fast Fill Modeling and Validation Experiments", presented at DOE Tank Safety Workshop, Apr. 29, 2010.
5. Y. Takagi et al, "Transport Phenomena during the Fast Filling Process in a Hydrogen Tank for the Fuel Cell Vehicle", J. of Advanced Research in Physics, in publication.
6. K. J. Kountz, Modeling the fast fill process in natural gas vehicle storage cylinders, presented at: 207th ASC National Meeting-Division of Fuel Chemistry, San Diego (1994)
7. ISO 11439:2000 International Standard, "Gas cylinders— High pressure cylinders for the on-board storage of natural gas as a fuel for automotive vehicles"
8. M. Trudgeon, "An Overview of NGV Cylinder Safety Standards, Production and In-Service Requirements", July 2005.
9. R. Hirotani et al., "Thermal Behavior in Hydrogen Storage Tank for Fuel Cell Vehicle on Fast Filling".
10. http://www.outlast.com/
11. David Hirschi, "Understanding Differences between Thermal Interface Materials: Improve your ability to specify the optimum TIM", Dow Corning Case Study.
12. Pasupathy and R. Velraj, "Phase Change Material Based Thermal Storage for Energy Conservation in Building Architecture", *International Energy Journal: Vol. 7, No. 2*, June 2006
13. http://www.gizmag.com/phase-change-cup-coffee/12596/
14. Hartmann et al., "Articles containing precisely branched functional polymeric phase change materials", US Patent 20120225290 A1, 2012.
15. A. Sharma, V. V. Tyagi, C. R. Chen and D. Buddhi, "Review on thermal energy storage with phase change materials and application", Renewable and Sustainable Energy Reviews, 2009, Vol. 13, Issue 2, pp 318-345.
16. L. G. Socaciu, "Thermal Energy Storage with Phase Change Materials", Leonardo Electronic Journal of Practices and Technologies', Issue 20, January-June 2012, pp 75-98.
17. http://www.micronal.de/portal/basf/ien/dt.jsp?setCursor=1__290814
18. http://en.wikipedia.org/wiki/Rotational_molding
19. http://www.engineershandbook.com/MfgMethods/blow-molding.htm
20. http://www.compositesworld.com/articles/next-generation-pressure-vessels
21. http://lightsailenergy.com/index.html The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for increasing the amount of gas filled in a vessel during a gas filling process, said method comprising providing a phase-change material on the inner surface of said vessel such that the presence of said phase-change material in the inner surface of said vessel substantially reduces a temperature increase during a gas filling process thereby allowing said vessel to be filled with a higher amount of gas during the gas filling process compared to a similar vessel in the absence of said phase-change material.

2. The method of claim 1, wherein said inner surface of said vessel further comprises a thermoplastic.

3. The method of claim 1, wherein said phase-change material is interdispersed within said inner surface of said vessel.

4. The method of claim 1, wherein said phase-change material is microencapsulated within said inner surface of said vessel.

5. The method of claim 1, wherein said phase-change material is coated onto said inner surface of said vessel.

6. The method of claim 1, wherein said vessel is made from a material comprising said phase-change material.

7. The method of claim 1, wherein said phase-change material reduces the temperature increase by at least 10° C. during a fast-fill process compared to a similar vessel in the absence of said phase-change material.

* * * * *